Nov. 29, 1938.  F. W. TRABOLD  2,138,462

METHOD OF SHAPING FOOD PRODUCTS

Filed Jan. 18, 1937

INVENTOR.
Frank W. Trabold
BY
ATTORNEY.

Patented Nov. 29, 1938

2,138,462

UNITED STATES PATENT OFFICE 2,138,462

METHOD OF SHAPING FOOD PRODUCTS

Frank W. Trabold, Detroit, Mich.

Application January 18, 1937, Serial No. 121,054

5 Claims. (Cl. 99—176)

This invention relates to the manufacture of food products and particularly ground meat products and has for its object to provide a method of manufacture of such meats as weiners, sausages and the like into a novel shape.

It is easily seen that if a wiener of cylindrical shape is flattened the cubic capacity of the wiener casing is decreased so that the casing must elongate or the meat product therein must be compressed. The conventional casing will not stretch by an appreciable amount and undue compression of the contained product militates against its taste. In view of this, attempts have been made to partially fill the casing but, because of the material variation in consistency of the raw products, the filling cannot be done with exactness so that the flattened final product either bursts because of overstuffing or, if insufficiently filled, has irregular sidewalls which are not attractive in appearance and which therefore interfere with commercial exploitation.

It is, therefore, the principal object of this invention to provide a novel casing and to teach the method of manufacturing flat products by the use thereof.

More particularly it is the object of the invention to provide a casing of substantially inexpansible material which is partially collapsed before filling and which will automatically release to the desired peripheral dimension at or before subjection to the flattening operation.

Other objects and advantages will become hereinafter more fully apparent as reference is had to the accompanying drawing wherein my invention is illustrated, by way of example, and in which Fig. 1 is a diagrammatic perspective of the actual and of the desired cubic capacity of the casing.

Figure 1:
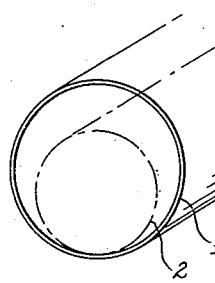

More particularly, 1 indicates a casing for ground meat products which may be made of the entrails of sheep, of sheet cellulose products or any desired material which lends itself to the purpose. The peripheral area of this casing for the final desired product is illustrated in full lines in Fig. 1 and the proper amount of filling which must be given for a smooth, attractive baking final product is indicated by the dotted lines 2. In order to obtain a filling to the capacity 2, I crimp the casing 1 thereby forming a fold 3. Between some or all the layers of this fold I apply an adhesive which has the quality of dissolving in the presence of moisture and also of being edible without injury and tasteless. Adhesives answering these requirements can be purchased in the open market.

Figure 3:
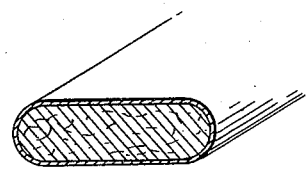
Fig. 3 is a fragmentary perspective section of the final product.

This creased casing is then filled as shown at 4 according to present methods of filling. The casings are of considerable length and after being filled, according to ordinary manufacturing practices a short interval of time elapses before being further processed. This interval of time is sufficient to permit loosening or releasing of the adhesion of the fold because of the penetration through the casing of moisture from the contained product so that when the product is placed in the mold 5 it may be flattened into the shape illustrated in Figs. 3, 5 and 6 by the application of pressure to the halves of the mold.

Figure 4:
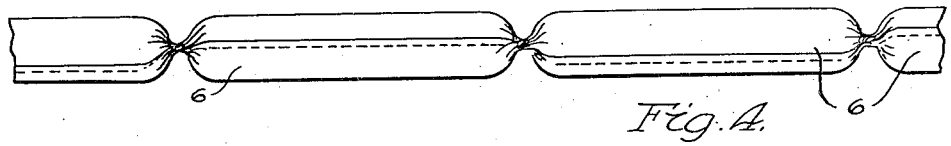
Fig. 4 is an elevation of the casing after initial filling and after twisting.

Immediately after filling at any time before the imposition of flattening pressure, individual links 6 may be formed as shown in Fig. 4.

Figure 5:
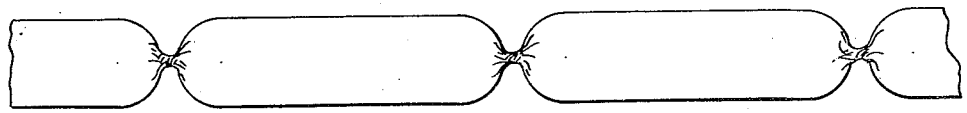
Fig. 5 is a plan view of the final product.
Figure 6:
Fig. 6 is a side elevation of the final product.
Figure 7:
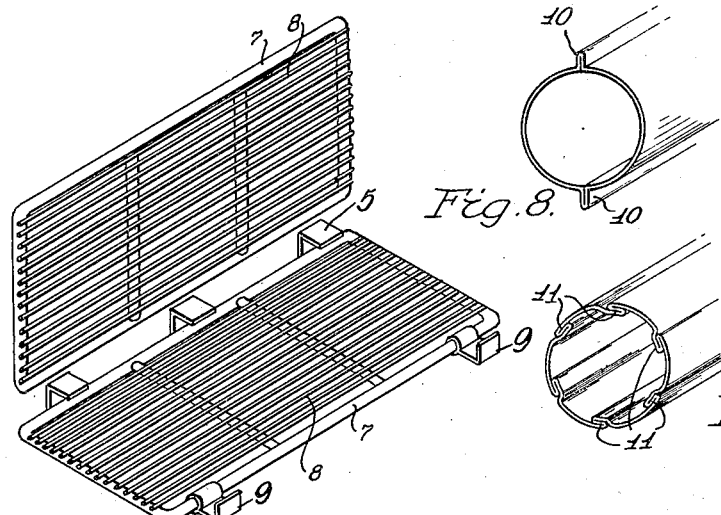
Fig. 7 is a perspective of the mold.

The mold is preferably made of a wire framing 7 which lends rigidity to the screen or strand bottom and top 8. Clamps 9 hold the two mold parts in pressure relation against the links. Cooking is done while the links are retained in flattened condition which is the reason for the wire top and bottom, the filled mold being subjected to smoking, steam treatment or hot water cooking as may be desired. The final product is indicated in Figs. 5 and 6.

Figure 2:
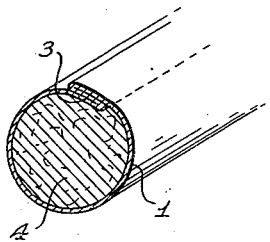
Fig. 2 is a fragmentary perspective section of my improved casing immediately after filling.
Figure 8:
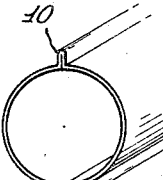
Fig. 8 is a fragmentary perspective of a modified form of casing.
Figure 9:
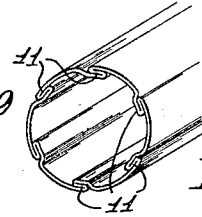
Fig. 9 is a view similar to Fig. 8 of another modification.

In Fig. 8 the casing is similar to that of Fig. 2 but there are two folds 10 with the folds sealed to themselves but not to the casing proper. In Fig. 9 a multiplicity of folds 11 are illustrated.

While the adhesion of the folds has been described as released by moisture it will be understood that that is the preferred manner of causing the release. If desired the adhesive could release as a result of the application of the pressure of the mold as flattening is begun.

What I claim is:—

1. As an article of manufacture, a casing for finely divided food products which consists of a moisture permeable flexible tubing creased lengthwise thereof, the fold of the crease being sealed to the tubing proper by an edible adhesive soluble in water.

2. The method of making a casing for ground meat products which consists in forming a tube of pliable material, in forming a fold longitudinally of said tube and in sealing said fold upon itself with a water soluble adhesive.

3. The method of making link meat products which consists in forming a casing therefor with a longitudinal crease, in sealing the fold of said crease upon itself with a readily releasable adhesive, in filling said casing with ground meat products, in applying pressure to the filled casing and increasing the peripheral area of the casing by causing the crease to unfold, and in subjecting the product to cooking.

4. The method of making link meat products which consists in forming a casing therefor with a longitudinal crease, in sealing the fold of said crease upon itself with a water soluble, edible adhesive, in filling said casing with moist food products, in twisting the filled casing at intervals to form links, in applying pressure to the filled casing and increasing the peripheral contour thereof by the unfolding of said crease, and in subjecting the product to cooking.

5. The method of making link meat products which consists in forming a casing therefor with a longitudinal crease, in sealing the fold of said crease upon itself with a water soluble, edible adhesive, in filling said casing with moist food products, in twisting the filled casing at intervals to form links, in allowing the links to stand for an interval of time whereby the moisture of the filler material causes said adhesive to release, in subjecting said links to the pressure of flat parallel surfaces, and in subjecting the links to cooking temperatures while retaining the pressure thereon.

FRANK W. TRABOLD.